United States Patent
Kuehnhoefer et al.

(10) Patent No.: US 9,148,079 B2
(45) Date of Patent: Sep. 29, 2015

(54) METHOD FOR OPERATING AN ELECTRIC MOTOR

(71) Applicant: ZF LENKSYSTEME GMBH, Schwaebisch Gmuend (DE)

(72) Inventors: Thomas Kuehnhoefer, Heubach (DE); Alexander Krautstrunk, Durlangen (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 32 days.

(21) Appl. No.: 14/143,664

(22) Filed: Dec. 30, 2013

(65) Prior Publication Data
US 2014/0210394 A1 Jul. 31, 2014

(30) Foreign Application Priority Data
Jan. 30, 2013 (DE) .................... 10 2013 201 468

(51) Int. Cl.
*H02P 7/00* (2006.01)
*B62D 5/04* (2006.01)
*H02P 29/00* (2006.01)

(52) U.S. Cl.
CPC ............. *H02P 7/00* (2013.01); *B62D 5/0463* (2013.01); *B62D 5/0496* (2013.01); *H02P 29/0055* (2013.01); *H02P 29/0066* (2013.01)

(58) Field of Classification Search
CPC ........................................................ H02P 7/00
USPC ......................................... 318/634, 632, 560
See application file for complete search history.

(56) References Cited

U.S. PATENT DOCUMENTS

| | | | | |
|---|---|---|---|---|
| 6,147,465 A | * | 11/2000 | Hollenbeck | 318/400.26 |
| 7,129,660 B2 | * | 10/2006 | Fujita et al. | 318/434 |
| 7,248,009 B1 | * | 7/2007 | Sundquist | 318/434 |
| 8,310,193 B2 | * | 11/2012 | Harke | 318/561 |

FOREIGN PATENT DOCUMENTS

| | | |
|---|---|---|
| DE | 10 013 711 | 10/2001 |
| DE | 10 052 275 | 5/2002 |
| DE | 69 707 203 | 6/2002 |
| JP | 10-56799 | 2/1998 |
| JP | 2009-165232 | 7/2009 |

* cited by examiner

*Primary Examiner* — David S Luo
(74) *Attorney, Agent, or Firm* — Jordan and Hamburg LLP

(57) ABSTRACT

A method for operating an electric motor which is used as an electric servo drive in an electronic power steering system of a motor vehicle for power assistance and which has a number of magnetic elements and phase windings and is actuated and/or controlled by an electronic control unit of the electronic power steering system, wherein a temperature of at least one magnetic element of the electric motor is continuously determined during the operation of the electric motor by way of a temperature model and wherein, based on the temperature of the at least one magnetic element of the electric motor determined by way of the temperature model, an electrical current flowing in at least one of the phase windings of the electric motor is limited, taking into account a predeterminable limit temperature of the at least one magnetic element of the electric motor.

11 Claims, 1 Drawing Sheet

METHOD FOR OPERATING AN ELECTRIC MOTOR

BACKGROUND OF THE INVENTION

The invention relates to a method for operating an electric motor and to a method for operating an electronic power steering system of a motor vehicle. The invention additionally relates to an electronic power steering system of a motor vehicle and to an electronic control unit of such an electronic power steering system.

A steering system is known from DE 100 13 711 A1, which includes a servo drive for torque assistance (power steering). The degree of torque assistance in the described steering system is dependent on the vehicle speed. While the torque assistance is greater at a low vehicle speed (for example, so as to be able to operate the steering wheel without great effort when maneuvering the vehicle), the torque assistance is lowered at higher speeds (for example so as to increase driving stability when driving on a highway). The servo drive can be operated electrically or hydraulically. In addition to the servo drive, the steering system described in DE 100 13 711 A1 also comprises superimposition means, which generate an additional angle and superimpose this additional angle on the steering wheel angle predetermined by the steering handle.

It is known to operate electric motors as electric servo drives in electronic power steering systems or power steering devices. This is generally carried out by way of output stage driver circuits and inverters. The electric motors used typically comprise high-performance magnets. However, the magnetic properties of such high-performance permanent magnets are highly temperature-dependent. The permanent magnets or magnetic elements notably can lose the magnetic properties thereof in a manner that is entirely or partially irreversible if they are exposed to corresponding temperatures and opposing magnetic fields generated by electrical current. The magnets in electric motors must therefore be designed for extreme or maximum ambient requirements in terms of temperatures or opposing fields. The temperatures of the magnetic elements can usually not be directly measured during the operation of the electronic power steering system. Rare earth magnets are demagnetized more quickly at high temperatures, while ferrite magnets are demagnetized more quickly at cold or low temperatures.

Proceeding from this, it is the object of the present invention to provide a method of the type mentioned above, in which magnetic elements of the electric motor are effectively protected from temperature-dependent demagnetization during operation.

SUMMARY OF THE INVENTION

This object is achieved according to the invention by a method for operating an electric motor, which is used as an electric servo drive in an electronic power steering system of a motor vehicle for power assistance and which has a number of magnetic elements and phase windings and is actuated and/or controlled by an electronic control unit of the electronic power steering system, wherein a temperature of at least one magnetic element of the electric motor is continuously determined during the operation of the electric motor by way of a temperature model; wherein, based on the temperature of the at least one magnetic element of the electric motor determined by way of the temperature model, an electrical current flowing in at least one of the phase windings of the electric motor is limited, taking into account a predeterminable limit temperature of the at least one magnetic element of the electric motor.

The magnet temperature can advantageously be ascertained by way of a temperature model, which continuously determines or estimates the temperature of the magnetic elements during operation of the electric motor. The magnet temperature can moreover be limited by a limitation of the phase currents of the electric motor, taking into account a predeterminable limit temperature of the magnetic elements. The limit temperature of the at least one magnetic element can be a maximum temperature, which is not to be exceeded, or a minimum temperature, which is not to be fallen below.

By limiting the electrical currents flowing in the phase windings or motor windings of the electric motor, the power loss of the electric motor, the torque created in the electric motor and/or opposing magnetic fields generated by the electrical current can be limited. The limitation of the opposing magnetic fields plays a role in particular at very low temperatures when a minimum temperature of the at least one magnetic element is not to be fallen below. The limitation can likewise be achieved with the aid of the temperature model. The temperature model can have appropriate characteristic maps, characteristic curves, functions or tables for this purpose, which are ascertained in advance by experimentation, for example. Effective protection of the magnetic elements of the electric motor from demagnetization can be achieved by the measures according to the invention. As a result, the quality is considerably improved. In addition, less expensive magnets having lower coercive field strength and/or lower demagnetization resistance can be employed.

It is advantageous if the temperature model for determining the temperature of the at least one magnetic element of the electric motor receives, as input variables, at least one electrical current flowing in at least one of the phase windings of the electric motor, or a variable characterizing this electrical current, and/or at least one metrologically captured or calculated temperature that is present in a region of the electric servo drive. The at least one temperature present in the region of the electric servo drive can be an ambient temperature prevailing in the electronic control unit, in particular on a printed circuit board of the electronic control unit, and/or in the region of an output stage of the electronic control unit.

The temperature model can utilize the phase currents and the temperature in the electronic control unit (ECU/Electronic Control Unit), for example on the printed circuit board thereof and/or in the output stage, as input variables. In general, these variables are, in any case, metrologically captured by the ECU for control purposes and/or for protection. The determination of the magnet temperatures can thus be based on existing measured variables. Advantageously no additional sensors or the like are required.

The at least one temperature present in the region of the electric servo drive can be a temperature prevailing in at least one of the phase windings of the electric motor.

The temperature prevailing in at least one of the phase windings of the electric motor can be metrologically captured or calculated based on an electrical resistance in the at least one phase winding of the electric motor. Existing electrical currents and voltages in the at least one phase winding of the electric motor can be used to calculate the electrical resistance.

A permanently excited synchronous machine, preferably having three phase windings, can be used as the electric motor. Electronic or electromechanical power steering systems typically have a permanently excited synchronous motor as the servo motor.

The invention relates to a method for operating an electronic power steering system of a motor vehicle provided with an electronic unit and to an electronic power steering system of a motor vehicle.

The method according to the invention for operating an electric motor and/or for operating an electronic power steering system of a motor vehicle is preferably implemented as a computer program on a control unit, or distributed on multiple control units, of the electronic power steering system, other solutions also being possible of course. The computer program is stored for this purpose in a memory element of the at least one control unit. The method is carried out by way of processing on a microprocessor of the control unit. The computer program can be stored on a computer-readable data medium (disk, CD, DVD, hard drive, USB memory stick, SD card or the like) or an Internet server as a computer program product and can be transferred from there into the memory element of the control unit.

An exemplary embodiment of he invention is shown schematically hereafter based on the drawings.

DESCRIPTION OF THE PREFERRED EMBODIMENTS

Figure 1:
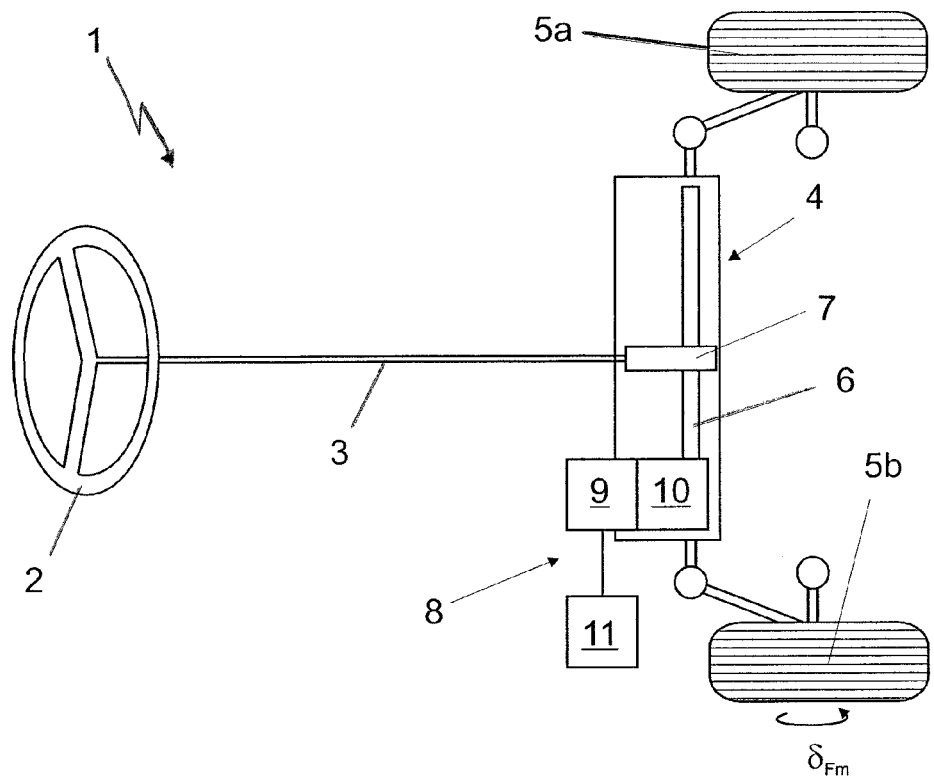
FIG. 1 shows a simplified schematic illustration of an electronic power steering system according to the invention, which is operated by a method according to the invention.

FIG. 1 shows an electronic or electromechanical power steering system 1 according to the invention of a motor vehicle, which is not shown, in a highly simplified illustration. The electronic power steering system 1 comprises a steering handle 2 designed as a steering wheel. The steering wheel 2 is connected to a steering gear 4 by way of a steering column or universal shaft 3. The steering gear 4 is used to convert a rotational angle of the universal shaft 3 into a steering angle $\delta_{Fm}$ of steerable wheels 5a, 5b of the motor vehicle. The steering gear 4 comprises a steering rack 6 and a pinion 7 for this purpose, the universal shaft 3 engaging on the pinion. The electronic power steering system 1 further includes an electric servo drive 8, which is used in particular for variable torque assistance. The electric servo drive 8 comprises an electric motor 9 for implementing the torque assistance by way of a belt drive 10. The belt drive 10 comprises a drive pinion and a pulley for transmitting the torque assistance by way of a recirculating ball gear (not shown in FIG. 1) to the steering rack 6 of the electronic power steering system 1. In addition, an electronic control unit 11 for actuating and/or controlling the electric motor 9 is provided. The invention will be described hereafter based on an electronic power steering system 1 comprising a belt drive 10 and a separate recirculating ball gear for transmitting the assistance force to the steering rack 6, as is known from DE 100 52 275 A1, for example. However, identical implementations according to the invention can be achieved for additional electrical steering system technologies having torque or steering assistance through minor modifications. The electric motor can also be a superposition angle actuator, if the power steering system according to the invention is a superimposed steering system (not shown).

In the figures, functionally equivalent elements are denoted by the same reference numerals.

Figure 2:
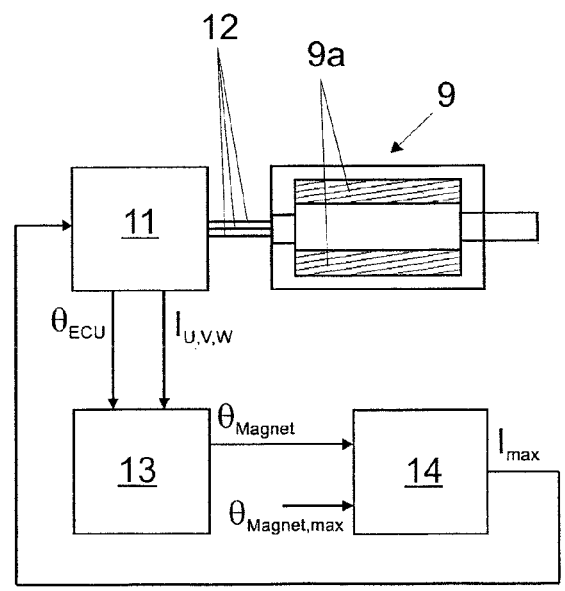
FIG. 2 shows a simplified schematic to illustrate the method according to the invention for operating an electric motor.

FIG. 2 shows a drastically simplified sketch of the actuation of the electric motor 9 by the electronic control unit 11 via motor phase lines 12, which lead to phase windings (not shown) of the electric motor 9. The electric motor 9 comprises permanent magnets or magnetic elements 9a.

As indicated in FIG. 2, a method for operating the electric motor 9, which is used as an electric servo drive 8 in the electronic power steering system 1 of the motor vehicle for power assistance, and which has a number of magnetic elements 9a and phase windings, and is actuated and/or controlled by the electronic control unit 11 of the electronic power steering system 1, can take place on the electronic control unit 11, wherein a temperature $\theta_{Magnet}$ of at least one magnetic element 9a of the electric motor 9 is continuously determined during the operation of the electric motor 9 by way of a temperature model 13;

wherein, based on the temperature $\theta_{Magnet}$ of the at least one magnetic element 9a of the electric motor 9 determined by way of the temperature model 13, an electrical current $I_{U,V,W}$ flowing in at least one of the phase windings of the electric motor 9 is limited, taking into account a predeterminable maximum temperature $\theta_{Magnet,max}$ as the limit temperature of the at least one magnetic element 9a of the electric motor 9. In further exemplary embodiments, a minimum temperature which must not be fallen below could also be used as the limit temperature.

The limitation takes place in a functional block 14. The temperature model 13 and the limitation 14 can be implemented on the electronic control unit 11, for example.

As is further apparent from FIG. 2, the temperature model 13 for determining the temperature $\theta_{Magnet}$ of the at least one magnetic element 9a of the electric motor 9 receives, as input variables, at least one electrical current $I_{U,V,W}$ flowing in at least one of the phase windings of the electric motor 9 and/or at least one metrologically captured or calculated temperature $\theta_{ECU}$ that is present in a region of the electric servo drive 8.

The at least one temperature present in the region of the electric servo drive 8 can be an ambient temperature ($\theta_{ECU}$) prevailing in the electronic control unit 11, in particular on a printed circuit board of the electronic control unit 11, and/or in the region of an output stage of the electronic control unit 11.

In further exemplary embodiments, which are not shown, the at least one temperature present in the region of the electric servo drive 8 can be a temperature prevailing in at least one of the phase windings of the electric motor 9. The temperature prevailing in at least one of the phase windings of the electric motor 9 can be metrologically captured or calculated based on an electrical resistance in the at least one phase winding of the electric motor 9.

By limiting the electrical currents $I_{U,V,W}$ flowing in the phase windings or motor windings of the electric motor 9, the power loss of the electric motor 9, the torque created in the electric motor 9 and/or the opposing magnetic fields generated by the electrical current can be limited.

The electronic control unit 11 receives at least one maximum permitted electrical current $I_{max}$ flowing in the phase windings of the electric motor 9 from the limitation 14 for this purpose in the present exemplary embodiment.

The method according to the invention for operating the electric motor 9 and/or for operating the electronic power steering system 1 of the motor vehicle is preferably implemented as a computer program on the control unit, or distributed on multiple control units 11, of the electronic power steering system 1, other solutions also being possible of course. The computer program is stored for this purpose in a memory element of the at least one control unit 11. The method is carried out by way of processing on a microprocessor µC of the control unit 11. The computer program can be stored on a computer-readable data medium (disk, CD, DVD, hard drive, USB memory stick, SD card or the like) or on an Internet server as a computer program product, and can be transferred from there into the memory element of the control unit 11.

LIST OF REFERENCE NUMERALS

1 power steering system
2 steering wheel
3 universal shaft/steering column
4 steering gear
5a, 5b steerable wheels
6 steering rack
7 pinion
8 electric servo drive
9 electric motor
9a magnetic elements
10 belt drive
11 electronic control unit
12 motor phase lines
13 temperature model
14 limitation
$\theta_{ECU}$ ambient temperature
$\theta_{Magnet}$ temperature of the magnetic element
$\theta_{Magnet,max}$ maximum temperature
$I_{max}$ maximum phase current
$I_{U,V,W}$ phase currents
$\delta_{FM}$ wheel steering angle

The invention claimed is:

1. A method for operating an electric motor, which is used as an electric servo drive in an electronic power steering system of a motor vehicle for power assistance, and which has a number of magnetic elements and phase windings, and is actuated and/or controlled by an electronic control unit of the electronic power steering system:
    wherein a temperature of at least one magnetic element of the electric motor is continuously determined during the operation of the electric motor by way of a temperature model;
    wherein, based on the temperature of the at least one magnetic element of the electric motor determined by way of the temperature model, an electrical current flowing in at least one of the phase windings of the electric motor is limited, taking into account a predeterminable limit temperature of the at least one magnetic element of the electric motor;
    wherein the temperature model for determining the temperature of the at least one magnetic element of the electric motor receives, as an input variable, at least one metrologically captured or calculated temperature that is present in a region of the electric servo drive;
    wherein at least one temperature present in the region of the electric servo drive is a temperature prevailing in at least one of the phase windings of the electric motor; and
    wherein the temperature prevailing in at least one of the phase windings of the electric motor can be metrologically captured or calculated based on an electrical resistance in the at least one phase winding of the electric motor.

2. The method according to claim 1, wherein at least one temperature present in the region of the electric servo drive is an ambient temperature prevailing in the electronic control unit, in particular on a printed circuit board of the electronic control unit, and/or in the region of an output stage of the electronic control unit.

3. A method for operating an electronic power steering system of a motor vehicle, in which a steering wheel angle is predetermined by way of a steering handle as a measure of a desired steering wheel angle for at least one steerable wheel of the motor vehicle, and in which an electric servo drive having an electric motor is used for power assistance, the electric motor being actuated and/or controlled by an electronic control unit of the electronic power steering system, wherein the electric motor is operated by way of a method according to claim 1.

4. An electronic control unit of a motor vehicle for actuating and/or controlling an electric motor of an electric servo drive of an electronic power steering system, which is designed to carry out a method for operating the electric motor according to claim 1 and/or a method for operating the electronic power steering system of the motor vehicle.

5. An electronic power steering system of a motor vehicle, comprising an electric servo drive having an electric motor; and an electronic control unit according to claim 4.

6. An electronic control unit of a motor vehicle for actuating and/or controlling an electric motor of an electric servo drive of an electronic power steering system, which is designed to carry out a method for operating the electric motor according to claim 1 and/or a method for operating the electronic power steering system of the motor vehicle.

7. A method for operating an electric motor, which is used as an electric servo drive in an electronic power steering system of a motor vehicle for power assistance, and which has a number of magnetic elements and phase windings, and is actuated and/or controlled by an electronic control unit of the electronic power steering system;
    wherein a temperature of at least one magnetic element of the electric motor is continuously determined during the operation of the electric motor by way of a temperature model;
    wherein, based on the temperature of the at least one magnetic element of the electric motor determined by way of the temperature model, an electrical current flowing in at least one of the phase windings of the electric motor is limited, taking into account a predeterminable limit temperature of the at least one magnetic element of the electric motor;
    wherein the temperature model for determining the temperature of the at least one magnetic element of the electric motor receives, as input variables, at least one electrical current flowing in at least one of the phase windings of the electric motor, or a variable characterizing this electrical current, and/or at least one metrologically captured or calculated temperature that is present in a region of the electric servo drive;
    wherein at least one temperature present in the region of the electric servo drive is a temperature prevailing in at least one of the phase windings of the electric motor; and
    wherein the temperature prevailing in at least one of the phase windings of the electric motor can be metrologically captured or calculated based on an electrical resistance in the at least one phase winding of the electric motor.

8. A method for operating an electronic power steering system of a motor vehicle, in which a steering wheel angle is predetermined by way of a steering handle as a measure of a desired steering wheel angle for at least one steerable wheel of the motor vehicle, and in which an electric servo drive having an electric motor is used for power assistance, the electric motor being actuated and/or controlled by an electronic control unit of the electronic power steering system, wherein the electric motor is operated by way of a method according to claim 7.

9. An electronic control unit of a motor vehicle for actuating and/or controlling an electric motor of an electric servo drive of an electronic power steering system, which is designed to carry out a method for operating the electric motor according to claim 7 and/or a method for operating the electronic power steering system of the motor vehicle.

10. An electronic power steering system of a motor vehicle, comprising an electric servo drive having an electric motor; and an electronic control unit according to claim 9.

11. An electronic control unit of a motor vehicle for actuating and/or controlling an electric motor of an electric servo drive of an electronic power steering system, which is designed to carry out a method for operating the electric motor according to claim 7 and/or a method for operating the electronic power steering system of the motor vehicle.

* * * * *